May 19, 1959 V. K. ELORANTA 2,887,030
PHOTOGRAPHIC APPARATUS FOR TREATING SHEET MATERIALS WITH A FLUID
Filed March 12, 1957 3 Sheets-Sheet 1

INVENTOR.
Vaito K. Eloranta
BY Brown and Mikulka
and
Robert E. Cort
ATTORNEYS

May 19, 1959  V. K. ELORANTA  2,887,030
PHOTOGRAPHIC APPARATUS FOR TREATING SHEET MATERIALS WITH A FLUID
Filed March 12, 1957  3 Sheets-Sheet 3

INVENTOR.
Vaito K. Eloranta
BY Brown and Mikulka
and Robert E. Corb
ATTORNEYS

United States Patent Office 2,887,030
Patented May 19, 1959

2,887,030

PHOTOGRAPHIC APPARATUS FOR TREATING SHEET MATERIALS WITH A FLUID

Vaito K. Eloranta, Needham, Mass., assignor to Polaroid Corporation, Cambridge, Mass., a corporation of Delaware Application March 12, 1957, Serial No. 645,495

7 Claims. (Cl. 95—89)

This invention relates to photographic apparatus and, more particularly, to novel improvements in apparatus for processing photographic materials.

In the copending application of Edwin H. Land and Murry N. Fairbank, Serial No. 645,526, filed March 12, 1957, there is disclosed a photographic product in the form of a camera containing a plurality of photographic film units and capable of exposing and processing the film units to produce a plurality of photographic prints. The camera apparatus itself is of a novel, inexpensive construction which permits it to be thrown away after it has been employed to expose and process the film units with which it is provided.

The present invention has, as an object, the provision of a novel pressure-applying device, suitable for use in a camera of this type, for distributing a fluid processing reagent between a pair of liquid-confining layers of a film unit, the device being characterized by its simple and inexpensive construction and ease of fabrication and assembly.

Another object of the invention is to provide a novel device comprising a pair of substantially rigid pressure-applying members resiliently biased toward one another and formed of only two blanks of sheet metal.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The pressure-applying device of the invention is designed to distribute the fluid processing reagent in a thin layer between a pair of superposed photographic sheets. A number of photographic processes can be effected in this manner, this application being particularly concerned with processes involving the development of a latent image in an exposed photosensitive sheet and, more particularly, with processes involving the formation of a positive print on a second or print-receiving sheet, superposed with the photosensitive sheet, by the transfer of image-forming substances produced as a result of the development of the latent image.

Cameras of the type disclosed in the aforementioned patent application and described hereinafter are adapted to be employed with one or more film units to produce positive photographic prints. Each film unit comprises a photosensitive sheet preferably including a silver halide emulsion, a second or print-receiving sheet and a collapsible rupturable container of a fluid processing reagent preferably including a silver halide solvent and a silver halide developer associated with one of the sheets and located therebetween. Following exposure of the photosensitive sheet, the two sheets are superposed and the fluid processing reagent is spread from the container in a thin layer between the sheets. For further examples of photographic materials and processes of this type, reference may be had to Patent No. 2,543,181, issued February 27, 1951 in the name of Edwin H. Land.

Generally, the herein disclosed pressure-applying device comprises a pair of substantially rigid members located in juxtaposition and spring means for urging the members toward one another so as to apply compressive pressure to a film unit as it is moved between the members. The device of the invention is particularly adapted to be provided as an element of an inexpensive camera which is intended to be discarded following employment for producing a predetermined number of photographic prints and, accordingly, its construction is quite simple and inexpensive. The pressure-applying device is fabricated entirely of sheet metal and preferably from two sheet metal elements or blanks which can be easily formed and assembled together.

Figures 1, 2:
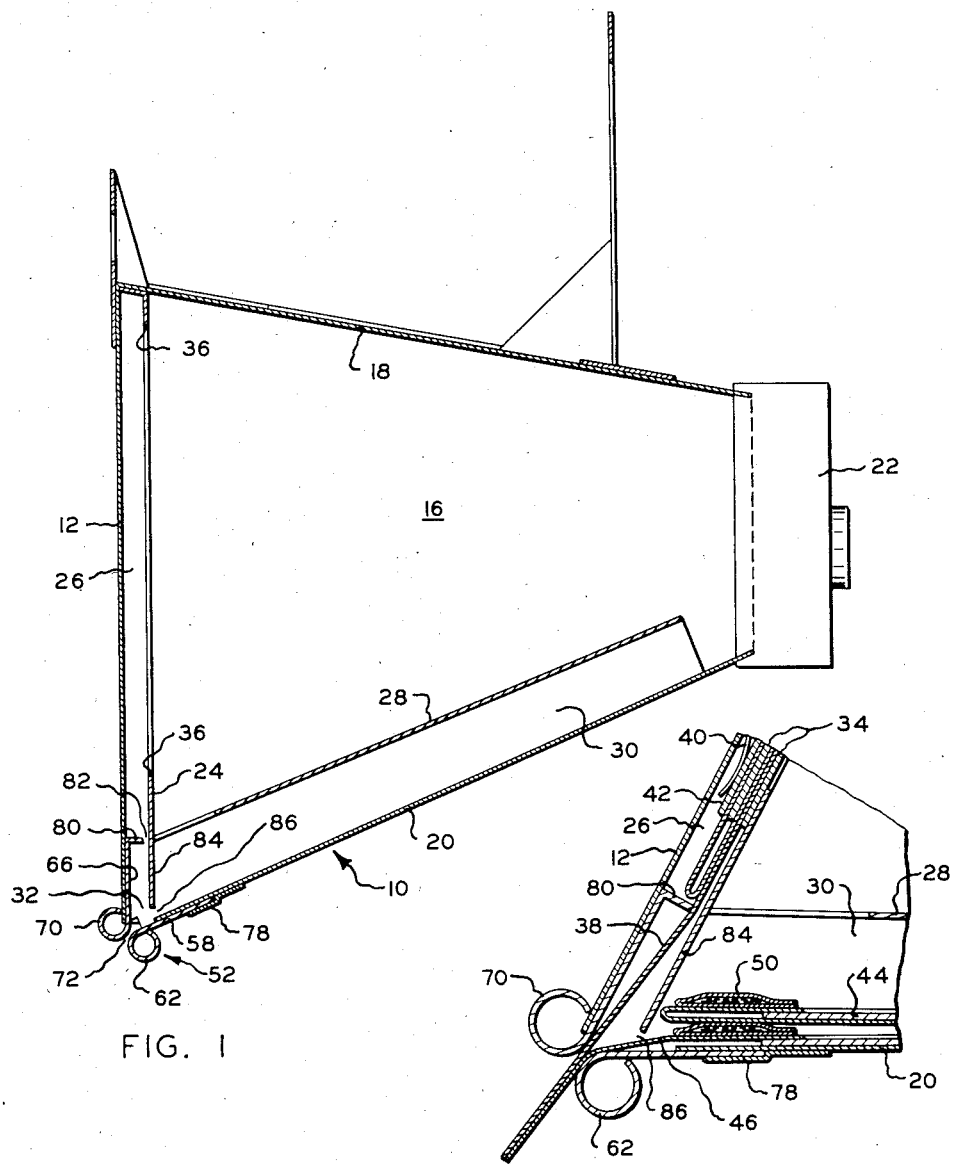
Figure 1 is a somewhat schematic sectional view of a camera embodying the invention.
Fig. 2 is a fragmentary perspective view, similar to Fig. 1, showing the pressure-applying device in greater detail, together with portions of photographic sheet materials provided in the camera.
Figure 3:
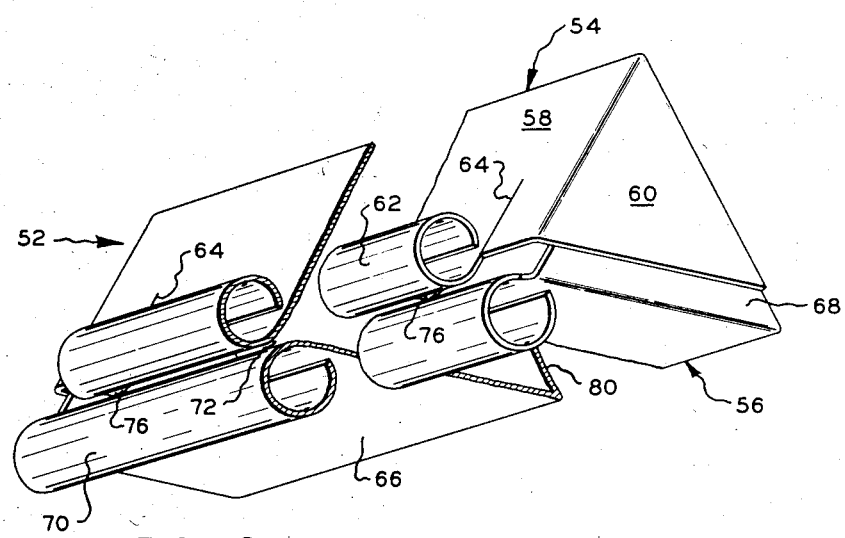
Fig. 3 is a perspective view, partially in section, of the pressure-applying device of the invention.
Figure 4:
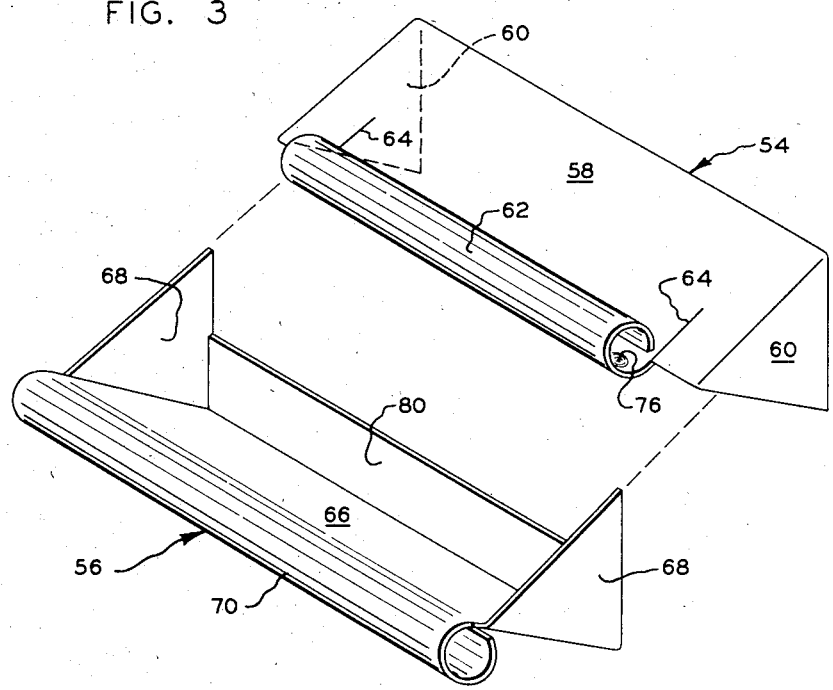
Fig. 4 is an exploded perspective view of the device of Fig. 3.
Figure 5:
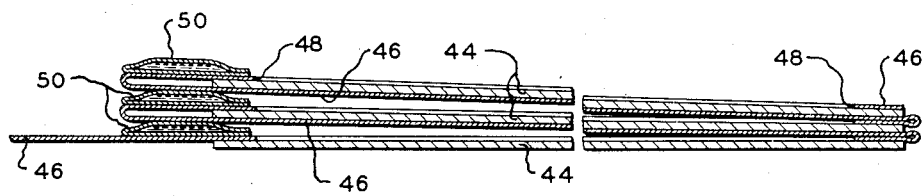
Fig. 5 is a somewhat schematic sectional view of a plurality of print-receiving elements adapted to be provided in the camera of Fig. 1 and employed with the pressure-applying device of the invention.
Figure 6:
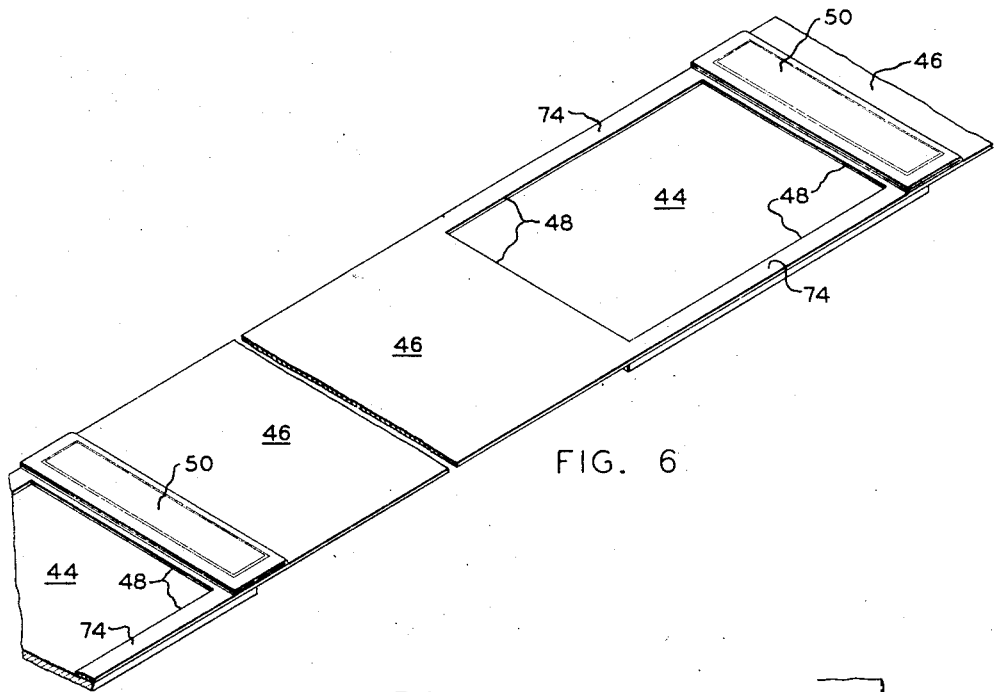
Fig. 6 is a perspective view of the print-receiving elements of Fig. 5 illustrating the carrier strip on which they are mounted.

Reference is now made to Figs. 1 and 2 of the drawings wherein there is illustrated one form of camera embodying the invention. The camera includes a casing 10 which may, in a preferred form, be fabricated entirely of sheet material, such as cardboard, and comprises a rear wall 12, generally triangular and parallel side walls one of which is indicated at 16, an upper wall 18 and a lower wall 20. Upper and lower walls 18 and 20 converge toward the front of the camera housing where a lens and shutter assembly 22 is mounted. The camera casing includes an inner rear wall 24 spaced from rear wall 12 for providing a first storage chamber 26 and an inner lower wall 28 cooperating with lower wall 20 to provide a second storage chamber 30 disposed at an angle with respect to first storage chamber 26. Inner walls 24 and 28, it will be noted, may comprise a single sheet of cardboard. Lower wall 20 is shortened somewhat so as to provide an opening 32 at the position where the lower and rear walls should intersect at the lower ends of chambers 26 and 30.

First storage chamber 26 is adapted to contain a plurality of photosensitive sheets 34 arranged in stacked relation and inner rear wall 24 is provided with a rectangular exposure aperture 36 through which the photosensitive sheets are exposed. Photosensitive sheets 34 are mounted on a continuous carrier strip 38 folded in a zigzag manner between successive photosensitive sheets whereby the photosensitive sheets may be withdrawn in succession from chamber 26 through opening 82. The rear surface of inner rear wall 24 is preferably located at the focal surface of the lens of assembly 22 so that the foremost photosensitive sheet, located against rear wall 24, is in position for exposure. A spring 40 and pressure plate 42 are provided in chamber 26 behind the stack of photosensitive sheets for urging the photosensitive sheets forward against inner rear wall 24.

A plurality of second or print-receiving sheets 44 are provided in stacked relation in storage chamber 30. Second sheets 44 are mounted on a continuous carrier strip 46 folded in a zigzag manner and attached to that surface of each of sheets 44 which is adapted to be superposed with a photosensitive sheet 34. Carrier strip 46 is provided with a series of rectangular apertures 48 slightly smaller than the second sheets and located in the region of the second sheets so that the portions of strip 46 bordering apertures 48 function as masks for defining the areas of the photographic prints produced on the second sheets. Attached to carrier strip 46 adjacent the lower or leading end of each print-receiving sheet 44 is a container 50 of a fluid processing reagent. Each container 50 is formed of a rectangular blank of fluid-impervious sheet material folded longitudinally to form two side walls which are sealed together at their margins to provide a fluid cavity. The longitudinal edge seal is adapted to become unsealed in response to hydraulic pressure generated in the fluid contents of the container by the application of compressive pressure to the walls thereof to effect the unidirectional discharge of the container contents. Each container is secured to the carrier strip with this longitudinal edge seal located closely adjacent the leading edge of a print-receiving sheet in position to discharge its contents between the print-receiving sheet and a photosensitive sheet superposed therewith.

The photosensitive and second sheets are superposed and the fluid processing reagent is spread in a thin layer therebetween during withdrawal of the sheets from the camera through opening 32 between a pair of pressure-applying members mounted across the opening. These members comprise a novel pressure-applying device 52 located in closing relation to opening 32 and including spring means for urging the pressure-applying members toward one another. Pressure-applying device 52 comprises two elements, designated 54 and 56, preferably fabricated from sheet metal, having at least some resiliency.

Element 54 comprises a generally flat rectangular section 58 having two dependent end sections 60 which are generally triangular in shape and extend in the same direction, and a rolled longitudinal edge section comprising a pressure-applying member 62. The rolled section or pressure-applying member 62 is shorter than rectangular section 58 so that it does not extend from end to end thereof and rectangular section 58 is provided with a pair of slits 64 located at the ends of pressure-applying member 62 and extending inwardly from the longitudinal edge of section 58 adjacent pressure-applying member 62 toward the opposite edge of section 58. The portion of section 58 located between slits 64 comprises and mounts pressure-applying member 62 and forms a cantilever spring for urging pressure-applying member 62 toward another pressure-applying member comprising element 56. The length of this spring and hence the force exerted thereby is a function of the length of slits 64.

Element 56 comprises a generally flat rectangular section 66, two dependent end sections 68 having generally rectangular shapes and a longitudinal rolled edge section comprising a pressure-applying member 70. Pressure-applying member 70 is longer than pressure-applying member 62 and extends substantially the full length of rectangular section 66. Elements 54 and 56 are secured together at triangular end sections 60 and 68 by any suitable method of joining metal, such as spot welding, with rectangular sections 58 and 66 disposed at an angle with respect to one another and with pressure-applying members 62 and 70 located closely adjacent one another so as to provide a convergent pressure-generating throat 72 through which a photosensitive and second sheet can be moved in superposition between said pressure-applying members.

Figure 7:
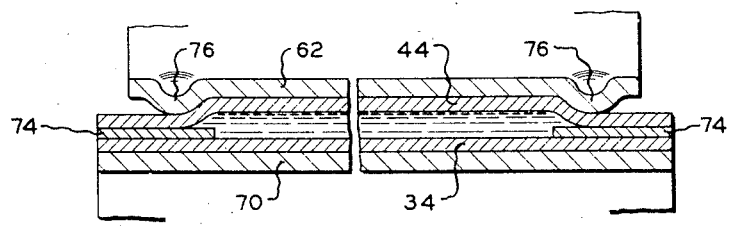
Fig. 7 is a fragmentary sectional view, though the device of Fig. 3, illustrating the operation of the device for spreading a fluid in a layer between a pair of superposed sheets.

The widths of the photosensitive and second sheets may be approximately equal and both exceed the length of pressure-applying member 62 so that, as a pair of sheets are moved in superposition between pressure-applying members 62 and 70, the lateral margins of the sheets extend beyond member 62 and may separate so as to function for trapping any of the fluid processing reagent which may spread laterally from between the sheets. The lateral portions, designated 74, of carrier strip 46, secured to the second sheets, not only function as masks to define the borders of the transfer prints produced on the second sheets but aid in confining the fluid reagent between the sheets and thereby control the thickness of the layer of fluid spread therebetween. In this regard, reference is made to Fig. 7 of the drawings wherein there is shown a schematic section taken longitudinally through the pressure-applying members and transversely of a pair of photosensitive and second sheets during movement of the sheets between the pressure-applying members and spreading of the layer of fluid. The thicknesses of the various sheets and layer of fluid are exaggerated for purposes of clarity of illustration. Pressure-applying member 62 is provided with a pair of raised sections or dimples 76 located adjacent its ends and projecting toward pressure-applying member 70 so as to reduce the width of the gap therebetween. The space between dimples 76 is less than the width of the sheets and exceeds the width of apertures 48, so that the dimples will engage the margins of the sheets in the regions of lateral portions 74 and intermediate the edges of said portions. Raised sections 76 also aid in controlling the thickness of the layer of fluid reagent and, because said sections allow the fluid reagent to enter between the inner edges of lateral portions 74 and the print-receiving sheet, they help to insure the formation of a transfer image in the entire area of the second sheet bordered by carrier strip 46, especially near the inner edges of lateral portions 74. If dimples 76 were not provided as shown, as the layer of fluid is spread between the sheets some of the fluid may be absorbed into the photosensitive sheet, leaving voids adjacent the print-receiving sheet and the inner edge of lateral portions 74.

Transfer of image-forming substances to the print-receiving sheet cannot be effected in the area of these voids; and in the present arrangement, as the photosensitive sheet absorbs some of the fluid, fluid located between lateral portions 74 and the print-receiving sheet is drawn toward the center of the sheets, taking the place of the fluid absorbed and preventing the formation of voids.

While the pressure-applying members have been shown as comprising longitudinal sections rolled substantially into the form of cylinders, this particular construction is not essential and the pressure-applying members may take other forms including folds and the like, the main requirement being that they are substantially rigid so as to prevent longitudinal bending. The surfaces of the two members comprising the pressure-generating throat 72 should be smooth and substantially parallel so that the two sheets can be readily moved therebetween and the layer of fluid is spread uniformly.

Rectangular sections 58 and 66 of pressure-applying device 52 are located at substantially the same angle with respect to one another as are rear wall 12 and lower wall 20 of camera casing 10. Device 52 is secured across opening 32 in closing relation thereto with section 66 located within the casing against the forward or inner surface of rear wall 12, the lower end portion of which projects into the rolled portion of section 66 comprising pressure-applying member 70 where it is retained. End sections 60 and 68 of the device are also located within the camera casing against side walls 14 and 16 and elongated rectangular section 58 is located exterior of the lower end portion of lower wall 20. To retain the pressure-applying device in place, a strip 78 of adhesive tape, paper or other light-opaque sheet material is secured to section 58 and lower wall 20 and extends around the ends of section 58 where it is secured to side walls 14 and 16.

The camera is assembled with carrier strips 38 and 46 extending from their respective storage chambers 26 and 30 into superposition and through throat 72 between pressure-applying members 62 and 70 from the camera. A photosensitive sheet 34 is processed following exposure by grasping the two carrier strips and withdrawing the exposed photosensitive sheet and a second sheet from the camera between the pressure-applying members. The camera casing includes means for insuring that only one pair of sheets at a time is withdrawn from the camera and, in the form shown, this means comprises a flange 80 turned up from an edge of elongated section 66 so as to extend forwardly across the lower end of chamber 26 toward inner rear wall 24 and provide a narrow gap 82 between flange 80 and inner rear wall 24 through which the foremost photosensitive sheet, located adjacent wall 24, is movable. A flange 84 is turned down from inner lower wall 28 so as to extend downward across the lower end of chamber 30 toward lower wall 20 and provide a gap 86 between flange 84 and lower wall 20 through which a second sheet, with a container attached thereto, is movable.

As the photosensitive sheet and second sheet are withdrawn in superposition between the pressure-applying members, the fluid processing reagent, carried in a container attached to the second sheet, is spread in a thin layer between the photosensitive and second sheets, effecting the processing thereof, preferably to form a positive print in the second sheet. The layer of fluid reagent is preferably quite viscous and serves to adhere the two sheets together as they are withdrawn from the camera. To prevent exposure of the photosensitive sheet, both sheets are opaque to actinic light or are provided with opaque backing layers which, in the case of the photosensitive sheets, may comprise the carrier strip. To aid in preventing exposure of the photosensitive sheet, a light-absorbing pigment or dye may be provided in the fluid reagent itself. The sandwich comprising the two sheets and layer of fluid reagent is maintained for a predetermined processing period, at the end of which the photosensitive and second sheets are stripped apart. The adhesive employed to secure carrier strip 46 to second sheets 44 is preferably so constituted that the carrier strip remains adhered to the photosensitive sheet by the processing fluid and is stripped from the second sheets, leaving a finished photographic print.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for superposing a pair of photographic sheets and spreading a fluid reagent in a layer between said sheets, said apparatus comprising, in combination, a pair of elements formed of resilient sheet metal and secured to one another at their ends, one of said elements including a longitudinal rolled edge portion comprising a first substantially inflexible pressure-applying member and a generally flat portion for mounting said member, the other of said elements including a longitudinal rolled edge portion comprising a second substantially inflexible pressure-applying member and a generally flat portion for mounting said second pressure-applying member in juxtaposition with said first pressure-applying member and for resiliently urging said second pressure-applying member toward said first pressure-applying member, said flat portions of said elements being disposed at acute angles with respect to one another substantially in intersecting planes so as to provide a convergent gap between said pressure-applying members through which a pair of sheets are movable in superposition.

2. The apparatus of claim 1 wherein said second pressure-applying member is shorter than said first pressure-applying member and said flat portion of said other element is provided with a pair of slits located adjacent the ends of said second pressure-applying member and extending from the edge of the last-mentioned flat portion adjacent said second pressure-applying member toward the opposite edge of said last-mentioned flat portion, the section of said last-mentioned flat portion between said slits comprising a spring for resiliently urging said second pressure-applying member toward said first pressure-applying member.

3. Photographic apparatus for superposing a pair of photographic sheets and spreading a fluid reagent in a layer between said sheets, said apparatus comprising, in combination, a pair of elements formed of resilient sheet metal, each of said elements including an intermediate section and two dependent end sections, said elements being secured to one another at said end sections with at least portions of said intermediate sections located substantially in convergent planes, an edge portion of one of said intermediate sections being rolled outward upon itself to provide a substantially inflexible pressure-applying member, an adjacent edge portion of the other of said intermediate sections being rolled outward upon itself to provide a second substantially inflexible pressure-applying member, said pressure-applying members including generally parallel portions located closely adjacent one another to provide a gap through which a pair of sheets may be advanced in superposed relation, the end portions of said second pressure-applying member extending in opposite directions beyond the ends of said first pressure-applying member, said one intermediate section being formed with slits extending from one edge of said one intermediate section adjacent the ends of said first pressure-applying member toward the opposite edge of said one intermediate section, the portion of said first intermediate section located between said slits comprising a cantilever spring mounting said one pressure-applying member for movement toward and away from said second pressure-applying member and urging said first pressure-applying member toward said second pressure-applying member.

4. The photographic apparatus of claim 3 wherein said parallel portion of said first pressure-applying member is provided with dimples adjacent the ends of said first pressure-applying member and projecting in said gap toward said parallel portion of said second pressure-applying member for engaging the margins of said sheets and predeterminedly spacing apart said parallel portions of said pressure-applying members during movement of said sheets through said gap between said members.

5. The device of claim 1 wherein said pressure-applying members are substantially elongated and one of said pressure-applying members includes end sections extending in opposite directions beyond the ends of the other of said pressure-applying members.

6. A photographic apparatus for superposing a pair of photographic sheets and spreading a fluid composition in a layer between said sheets, said apparatus comprising, in combination, a pair of elements each formed of a blank of resilient sheet metal and comprising a substantially flat elongated portion and dependent end portions, said elements being disposed with said elongated portions in substantially convergent planes and with said end portions of each of said elements extending toward the other of said elements, said elements being rigidly secured to one another at said end portions, the elongated portions of one of said elements having a longitudinal rolled edge section comprising a first substantially inflexible pressure-applying member, the elongated portion of the other of said elements including a longitudinal rolled edge section comprising a second substantially inflexible pressure-applying member, said elements being secured to one another with said first and said second pressure-applying members located in juxtaposed relation and said elongated portions converging toward one another at said pressure-applying members, said elongated portion of at least one of said elements comprising resilient means for mounting said first pressure-applying member for limited movement toward and away from said second pressure-applying member and for urging said first pressure-applying member toward said second pressure-applying member so as to apply compressive pressure to a pair of superposed sheets as said sheets are moved in superposition through said convergent gap between said pressure-applying members.

7. The apparatus of claim 6 wherein said first pressure-applying member is shorter than said second pressure-applying member and said elongated portion of said first element is provided with a pair of slits located adjacent the ends of said first pressure-applying member and extending from the longitudinal edge of said elongated portion of said first element adjacent said first pressure-applying member toward the opposite longitudinal edge of the last-mentioned elongated portion, the section of said last-mentioned elongated portion between said slits comprising a spring for resiliently urging said first pressure-applying member toward said second pressure-applying member.

References Cited in the file of this patent
UNITED STATES PATENTS 2,689,307   Fairbank _____ Sept. 14, 1954